United States Patent [19]

Ryan et al.

[11] 4,060,881
[45] Dec. 6, 1977

[54] CUTTER HEAD ASSEMBLY FOR GEAR CUTTING MACHINES

[75] Inventors: Arthur B. Ryan, Canandaigua; Charles B. Thomas, Rochester, both of N.Y.

[73] Assignee: The Gleason Works, Rochester, N.Y.

[21] Appl. No.: 741,837

[22] Filed: Nov. 15, 1976

[51] Int. Cl.² .......................................... B26D 1/12
[52] U.S. Cl. .................................................. 407/22
[58] Field of Search ......................... 29/105 R, 105 A

[56] References Cited

U.S. PATENT DOCUMENTS

| | | | |
|---|---|---|---|
| 1,898,051 | 2/1933 | Head | 29/105 A |
| 2,135,893 | 11/1938 | Head | 29/105 A |
| 2,186,417 | 1/1940 | Kraus | 29/105 A |
| 3,487,592 | 1/1970 | Kotthaus | 51/288 |
| 3,571,876 | 3/1971 | Blakesley | 29/105 R |
| 3,673,655 | 7/1972 | Eydienx | 29/105 A |
| 3,760,476 | 9/1973 | Kotthaus | 29/105 A |
| 3,881,889 | 5/1975 | Hunkeler | 51/288 |

FOREIGN PATENT DOCUMENTS 2,161,031  11/1972  Germany ........................... 29/105 R

*Primary Examiner*—Harrison L. Hinson
*Attorney, Agent, or Firm*—Ralph E. Harper

[57] ABSTRACT

A cutter head assembly is described as including blade-receiving slots of a particular design and geometry to receive different types of cutting blades having cutting face portions which do not require resharpening. The cutter head assembly provides for positioning of such different types of cutting blades so that a negative hook position is avoided for any blade designed within a range of selected parameters for use in the assembly. This assembly provides for radial adjustment of blade positions so as to offer different cutter diameters for a given assembly. In addition, cutting blades having built-in side rake angles are disclosed for use with such a cutter head assembly.

7 Claims, 8 Drawing Figures

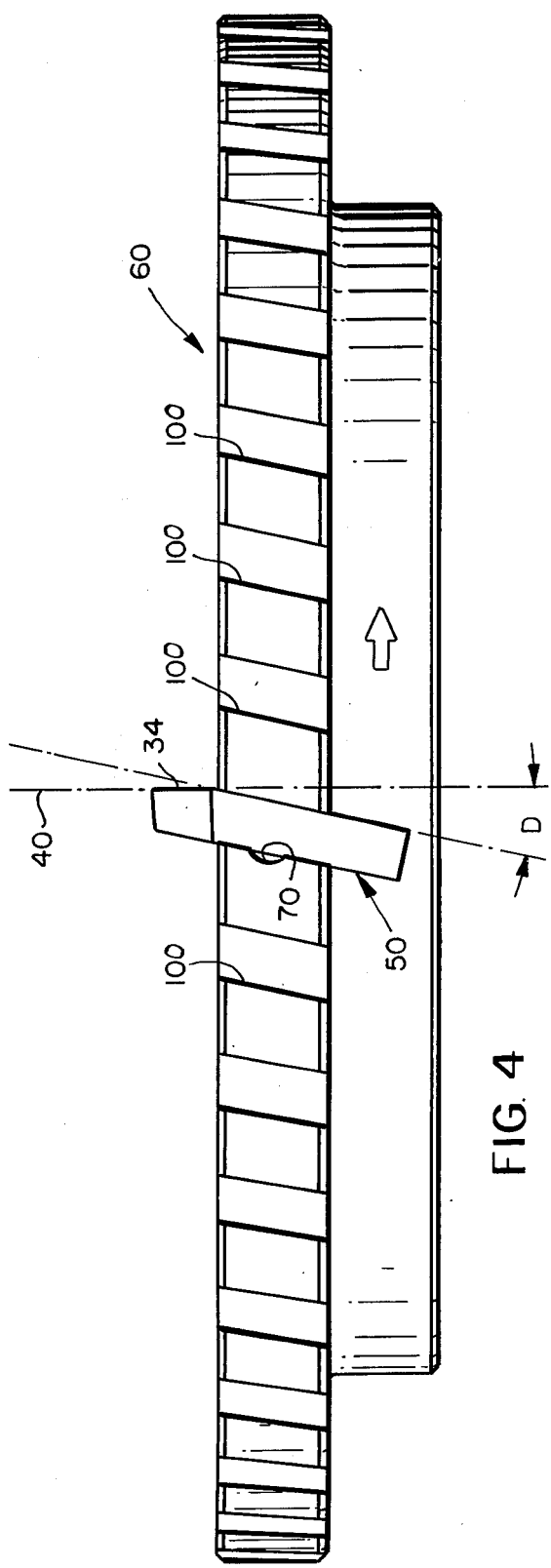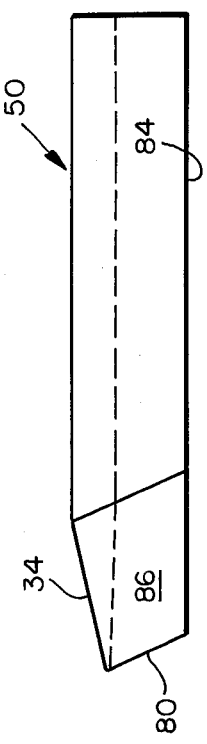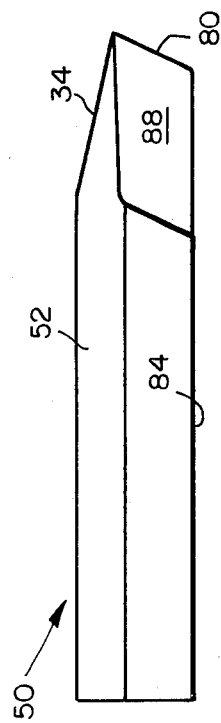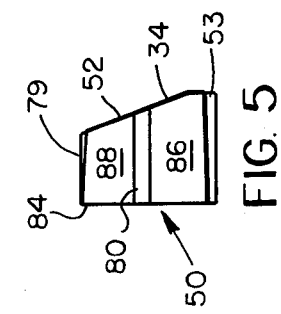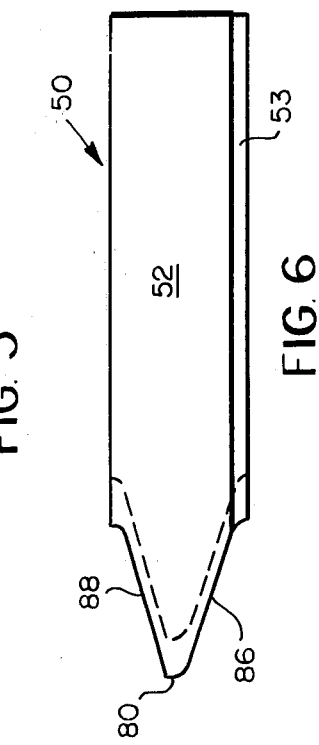
FIG. 4
FIG. 7
FIG. 8
FIG. 5
FIG. 6

CUTTER HEAD ASSEMBLY FOR GEAR CUTTING MACHINES

BACKGROUND AND BRIEF DESCRIPTION OF INVENTION

The present invention relates to improvements in cutter head assemblies intended for use in gear cutting operations. The cutter head assemblies are designed to carry cutting blades which have cutting face portions that are preserved during periodic resharpenings, and different types of cutting blades of this general character can be installed in cutter head assemblies of this invention to create single side, alternate side, or three-sided cutting actions with gear cutting machines capable of manufacturing spiral bevel and hypoid gears.

As discussed in U.S. Pat. No. 3,881,889 (commonly owned with the present application), it is known in this art to provide for cutter head assemblies which are designed to receive a plurality of cutting blades characterized by the ease with which they can be resharpened without disturbing a cutting (or front) face portion thereof. Cutting blades having this characterization offer advantages of ease of original manufacture from bar-stock and the possibility of metallurgical treatment of the critical cutting face portions of each blade. A type of cutter head assembly for receiving and carrying such blades is disclosed in U.S. Pat. No. 3,881,889 (and its companion Pat. No. 3,961,403), and the present invention represents an improvement in cutter head design when compared to the type of cutter head assembly shown in the aforesaid patent.

In addition, it is known in this art to provide for a cutter head assembly of the type shown in German Gebrauchsmuster No. 7,342,938 (registered for Werkzeugmaschinenfabrik Oerlikon-Buhrle A.G.) in which bar-stock cutting blades are carried in radially disposed and inclined (to the axis of rotation) slots in a cutter head assembly which thereby creates a relatively simple and easily assembled cutter head for gear cutting machines. However, the above-identified Gebrauchsmuster does not disclose a combination of cutting blade and cutter head geometry which permits the use of a variety of blade types with each blade having a front cutting face portion that can be preserved during resharpening thereof.

In accordance with the present invention a cutter head assembly includes certain basic components and features which are already known in the art. These features include the use of a cylindrical main body member having blade-receiving slots formed radially into its outer circumference and at an axial inclination to its center axis of rotation for receiving individual cutting blades, associated shims, and clamping blocks which position the blades in the blade-receiving slots. In addition, the assembly includes a ring member, as already known in the art, for enclosing the entire circumference of the main body member and for securing individual cutting blades within the blade-receiving slots. The individual cutting blades which are used in the cutter head assembly are characterized by their front face portions which do not require resharpening, as disclosed in the previously mentioned U.S. Pat. No. 3,881,889.

The improvements offered by the present invention for the type of cutter head assembly just described include specific features directed to the need for making such cutter head assemblies more universal in their capability for accepting different types of cutting blades for different gear cutting jobs. This need includes a requirement that a cutter head assembly can be set up to cut one, two, or three (inside, bottom, and outside) sides of a gear tooth slot for a given job and that such a cutter head assembly can be adjusted to different cutting diameters. This need is satisfied by specific design features of a cutter head assembly which includes the following combination of geometric and structural relationships:

1. Each blade-receiving slot is positioned to be generally included in or adjacent to a radius taken from the center axis of the main body member of the cutter head assembly so that a single blade carried within each slot can be radially adjusted relative to the center axis of the assembly. This feature provides for shimming of individual blades for purposes of truing a cutter or for adjusting its effective diameter. This adjustment can be made without changing the geometry requirements of cutting blades of the type contemplated herein.

2. Each blade-receiving slot is inclined to a plane passing through the center axis of rotation of the cutter head assembly at an included angle which is related to the pressure angle and side rake angle of any cutting blade to be received therein. This specific provision permits use of different cutting blade types as well as use of a range of pressure angles of up to 32° and side rake angles of up to 25° (for inside and outside cutting blades) for selected cutting blades, with no single blade having a negative hook angle in its mounted position relative to the cutter or workpiece. Slot inclinations for different pressure and rake angles can be determined in accordance with a formula which will be discussed later in this specification.

3. A plurality of cutting blades for use in the cutter head assembly with each of the cutting blades being of a type which includes a cutting face portion that is an extension of a shank portion thereof and which does not require resharpening when the cutting profile of the blade is resharpened. This feature permits the use of blades having treated or coated cutting faces. In addition, very specific cutting blade designs for inside and outside cutting blades are provided with built-in side rake angles in their shank cross-sections thereby permitting an easy change in side rake angle by simply selecting appropriate blade shank geometries.

The cutter head assembly of the present invention can be manufactured easily in accordance with known techniques, and additionally, it offers ease of assembly and disassembly when individual cutting blades are inserted and clamped (or conversely unclamped and removed) into (or out of) their respective slots. These and other features and advantages of the present invention will become apparent in the more detailed discussion which follows, and in that discussion reference will be made to the accompanying drawings as briefly described below.

BRIEF DESCRIPTION OF DRAWINGS

FIG. 4 is an elevational view of a main body member for the type of cutter head assembly illustrated in FIG. 3, shown in reduced scale from that of FIG. 3;

FIG. 5 is an end view of one type of cutting blade used in the cutter head assembly of this invention, as seen from the cutting end of the blade;

FIG. 6 is a top view of the cutting blade of FIG. 5, shown in the same scale as FIG. 5;

FIG. 7 is a side elevational view of the cutting blade of FIGS. 5 and 6, shown in the same scale as FIGS. 5 and 6; and FIG. 8 is a side elevational view of the same cutting blade and in the same scale as that shown in FIG. 7, as seen from an opposite side from what is shown in FIG. 7.

DETAILED DESCRIPTION OF INVENTION

Figure 1:
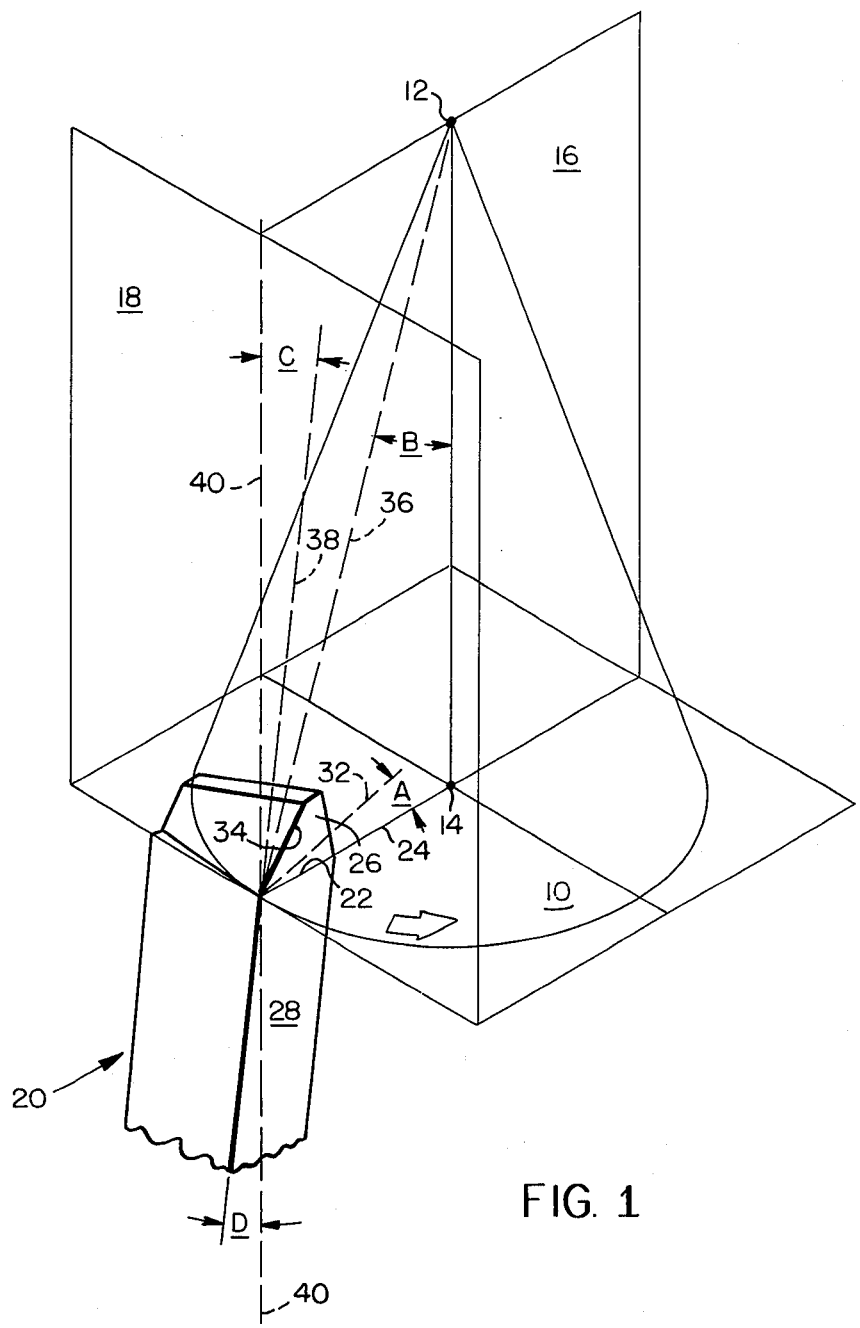
FIG. 1 is an isometric drawing showing geometric relationships of a cutter head and one type of cutting blade for purposes of establishing basic definitions used in this specification.
Figure 2:
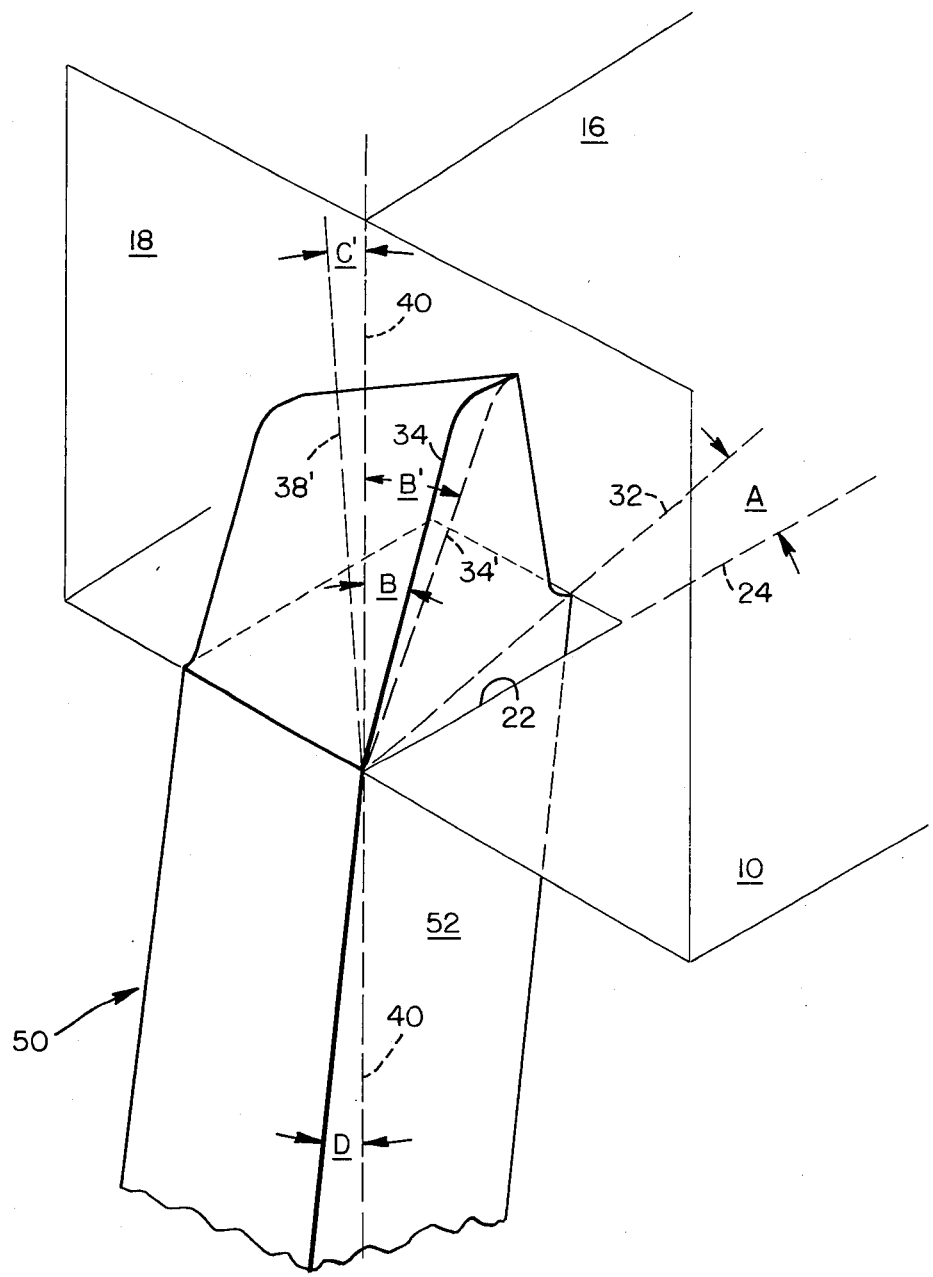
FIG. 2 is a drawing similar to a portion of FIG. 1, in greatly enlarged scale from that of FIG. 1, showing geometric relationships of another type of cutting blade used in the cutter head assembly of the present invention.

FIGS. 1 and 2 represent geometric relationships between a cutter head and cutting blades of the types contemplated herein. Since these drawings are intended only to supply basic information for definitions used in this specification and its claims, specific dimensional relationships which are shown are not intended to be necessarily accurate or in accordance with a preferred embodiment of the invention. In the context of this specification reference to different "types" of cutting blades is intended to describe differences in design and geometry for inside, outside, and bottom cutting blades, but all of these different types are characterized by front cutting faces which are preserved during resharpening.

Referring to FIG. 1, a plane of rotation for a typical cutter head is depicted in plane 10 as if it were rotating about a center axis of rotation 12–14. In addition, there is indicated a reference plane 16 which is positioned at a vertical right angle to the plane 10 so as to pass through the center axis of rotation 12–14. A third reference plane 18 is illustrated as being vertically positioned at right angles to both of the planes 10 and 16. A cutting blade 20 is illustrated in greatly enlarged scale relative to the plane of rotation 10 for illustrating basic geometric relationships which are typically established between a cutting blade and the front face of a cutter head assembly. For purposes of this discussion, the front face of the cutter head assembly can be assumed to be in the plane of rotation 10.

Considering the relationship shown in FIG. 1, it can be seen that the cutting blade 20 is fitted within a slot formed into the cutting plane 10 of a cutter head assembly. A front edge 22 of the slot is formed on a radius 24 of the cutter head assembly, a trailing edge of the slot is formed parallel to the front edge 22, and an inside edge is formed at right angles to the front and trailing edges, so as to define a substantially rectangular slot opening through the front face of the cutter head assembly. The cutting blade 20 is of a type manufactured from barstock of high speed steel (or other appropriate tooling material) having a rectangular cross section. Thus, the cutting blade 20 fits the shape of the slot. The cutting blade 20 includes a cutting face portion 26 which constitutes an extension of the shank portion 28 and is not intended to be shaped or reground when the cutting blade 20 is sharpened. This cutting face portion constitutes an interface between the cutting tool and the chips that are produced during a cutting operation.

The type of cutting blade which is illustrated in FIG. 1 may be considered a "bottoming" blade in this art of cutting tooth slots in gear pieces with tooling which requires different types of cutting blades for forming side and bottom portions of each gear tooth slot. The bottoming blade 20 includes no side (or radial) rake in its design, as is understood in this art, but for purposes of defining side rake as it will be used herein, FIG. 1 illustrates an angle A which would be formed in the plane of rotation 10 with respect to the radius 24 if the front face of the cutting blade 20 were either re-shaped or the blade turned within its axis so that its trace in plane 10 would produce an imaginary line 32. This angle will be referred to as side rake angle.

Reference will also be made to the pressure angle of cutting blades of the type contemplated herein, and the pressure angle of a cutting blade is determined by the angular position of a cutting edge 34 of the cutting blade relative to the center axis of rotation 12-14 of the cutter head assembly. This angular relationship is determined by a projection 36 of the cutting edge 34 as it would appear projected and extended onto the plane 16. As shown in FIG. 1, the pressure angle of the illustrated cutting blade would be the angle B between the projection 36 and the axis of rotation 12-14 of the cutter head assembly.

It is a standard practice in the art of designing and building cutter head assemblies of the type contemplated herein to avoid a blade positioning referred to as a "negative hook angle." Hook angle, as used herein, will be considered to be the angle C formed between the trace 40 of the plane 16 (as it would appear in the plane 18) and a projection 38 of the cutting edge 34 onto the plane 18. In the case of the cutting blade illustrated in FIG. 1, the projection of the cutting edge 34 onto the plane 18 forms a positive hook angle C with the trace 40 in that same plane, and therefore the cutting blade position is one which produces a desired positive hook angle for the type of blade shown. If the tip of the cutting blade 20 were inclined more in the direction of rotation (as shown by the arrow) of the cutter head assembly, the positive hook angle C created between the cutting edge 34 and the trace 40 would be greater. If, on the other hand, the tip of the cutting blade 20 were tilted backwardly from the position shown (and away from the direction of rotation), there would be a movement towards a negative hook angle. In cutter head designs of the type which utilize three different types of cutting blades (for cutting inside, outside, and bottom surfaces of each gear tooth slot), it is considered desirable to position each "bottoming" blade (of the type shown in FIG. 1) with a positive hook angle and each "inside" and "outside" cutting blade in relative positions which provide for zero hook (or positive) angles relative to the cutter head assembly and a workpiece. In order to do this it is necessary to axially incline the blade-receiving slots provided in the main cutter body with reference to the plane 18. This angle can be represented as an angle of inclination D formed between a leading edge or face of the blade and the trace 40. In the case of the bottoming blade shown in FIG. 1, angle D is equal to angle C.

FIG. 2 illustrates the effect of providing a side rake angle A on a cutting blade 50 which is of a type for cutting one of the side surfaces (outside) of a slot in a gear tooth workpiece. Such side cutting blades must be provided with side rake angles to achieve the desired cutting action. Side rake angles can be ground onto front faces of cutting blades or by mounting cutting blades in skewed slots in a cutter head (as described in U.S. Pat. No. 3,961,403), but side rake angles are formed on inside and outside cutting blades of this invention by forming the front face 52 (including the cutting face and the blade shank) of the cutting blade at an appropriate angle. This changes the cross sectional shape of the cutting blade shank from a rectangular shape to the cross sectional shape shown in FIG. 5 wherein the front cutting face portion 52 is formed by removing material from bar-stock which otherwise would have a rectangular cross-sectional shape. This unusual shape for a cutting blade permits full control over desired side rake angles by simply selecting or regrinding bar stock to the required angle. With respect to side cutting blades of the type shown in FIG. 2, the shaped front cutting face has an effect on the projection of the cutting edge 34 onto the plane 18, and therefore affects the hook angle C of the blade. In fact, if such a cutting blade were positioned in a slot having no inclination relative to the axis of rotation of the cutter head assembly, there would be produced a negative hook angle C between the projection of the cutting edge 34 and the trace 40 in the plane 18. As indicated earlier, negative hook angles are not desirable for optimum cutting efficiency of cutting blades, and therefore, all cutting blades must be positioned in slots which are inclined (angle D) to the axis of rotation of the cutter head assembly. This inclination can be seen more readily in the FIG. 4 illustration (which will be discussed in greater detail below), although a similar inclination is intended to be shown in the FIG. 2 illustration in which the cutting blade 50 is inclined sufficiently to produce a desired zero degree hook angle (in which a projection of its cutting edge 34 onto the plane 18 and the trace 40 coincide). However, even with this inclination there is a limit to the range of pressure angles B that can be accommodated in such cutter heads and blades. This can be seen by the negative hook angle C' which is produced when the pressure angle is increased to B' (and cutting edge 34 is moved to the dashed line position 34') as shown in FIG. 2. Therefore, the angle of inclination D which is built into the cutter head is selected to accommodate a range of pressure angles that will be formed on "inside" and "outside" cutting blades used in the cutter head.

Thus, it is a feature of the present invention that different types of cutting blades having cutting face portions that are not sharpened during use can be accommodated in a cutter head assembly if the slots for positioning such blades are formed with front faces generally on a radius of the cutter head and with a depthwise (from front to back of the cutter head assembly) inclination which tilts the cutting tip portion of each cutting blade in the direction of rotation of the cutter head assembly.

In order to provide for use of a range of blade geometries in any given cutter head assembly, while avoiding a negative hook angle C for any of the different types of blades that may be utilized, the following relationship should be observed:

$$\tan D = \tan C + \tan B \tan A$$

where:
$D$ = inclination angle of blade slot
$C$ = hook angle and is $\geqq 0$
$B$ = pressure angle of blade
$A$ = side rake angle of blade Thus, it has been found, for example, that inside and outside cutting blades having pressure angles of about 30° (and up to 32°) and preferred side rake angles of about 20° should be mounted in blade-receiving slots having an inclination angle $D$ of about 12° to provide a zero degree hook angle $C$ for such blades. Bottoming blades carried in the same type of blade-receiving slot have a very desirable positive hook angle of about 12°. In this way a cutter head body can be manufactured with a plurality of slots having identical inclination angles, and such a cutter head will accommodate inside, outside, and bottom cutting blades in a preferred assembly of blade geometries for a given gear cutting job.

Having discussed basic geometric relationships above, it can be appreciated that the present invention solves a problem of designing cutter head bodies which are capable of carrying different types of cutting blades and a range of cutting blade geometries within any given type. All cutting blades can be adjusted in their radial positions; it is not necessary to resharpen any part of the blade geometry into the front faces of any of the cutting blades; and side rake angles can be changed in a given cutter head assembly by simply changing cutting blades (and not the cutter head body, as required in the cutter head design shown in U.S. Pat. No. 3,961,403). Thus, the cutter head assembly described herein is more universal than previously known cutter heads for receiving cutting blades of the type provided by this invention.

Figure 3:
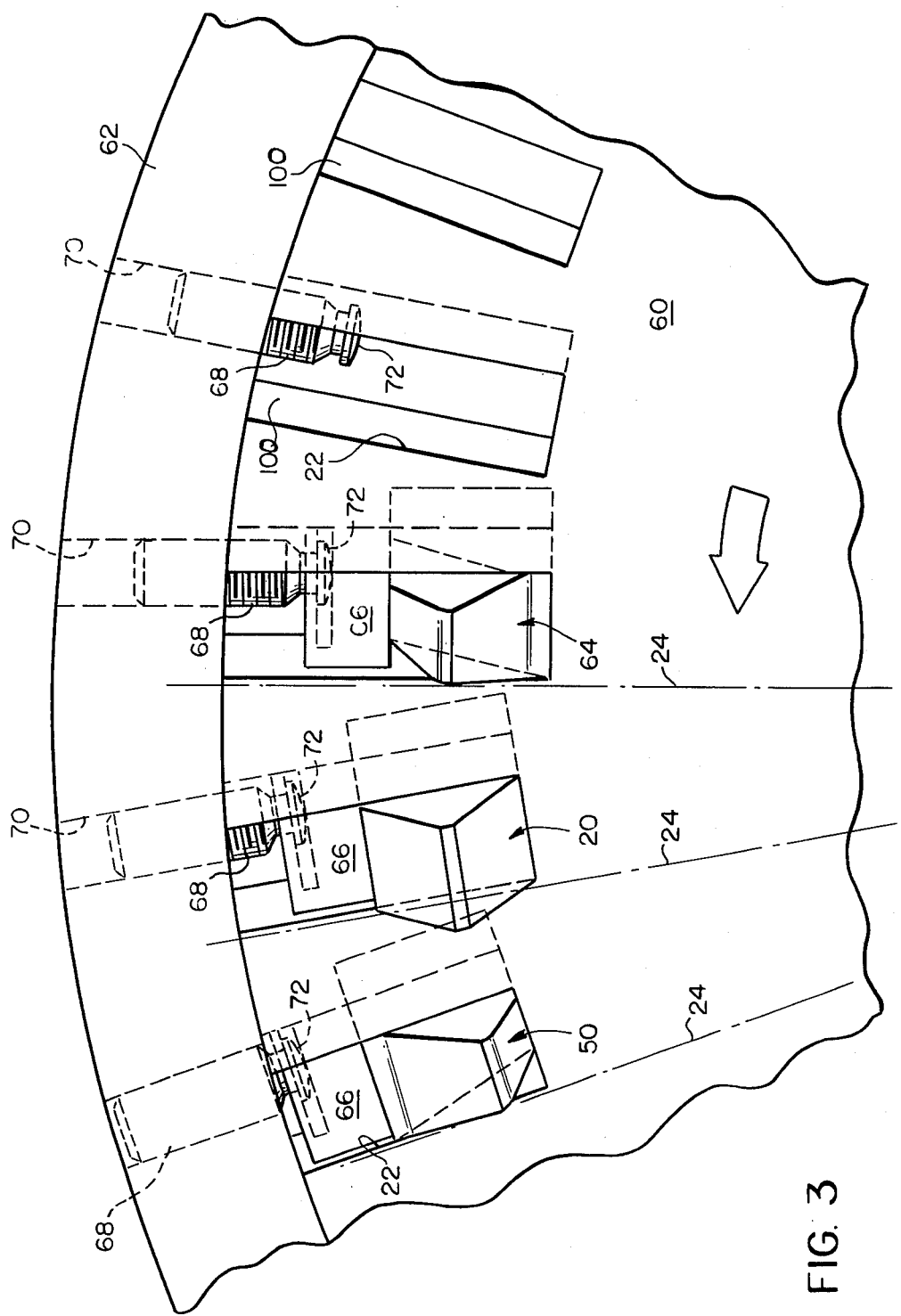
FIG. 3 is a top plan view of a portion of a cutter head assembly which has been manufactured and tested by applicants herein.

FIG. 3 illustrates a specific example of a relatively large cutter head assembly which has been manufactured and tested in accordance with the present invention. The illustrated cutter head assembly is of a type for use in cutting relatively large ring gears for truck differentials, and the illustrated cutter head assembly is considered to be a preferred embodiment, at the time of writing this specification, for this type of usage.

Referring to FIG. 3, a portion of a cutter head assembly is shown in top plan view for purposes of illustrating the installation of three different types of cutting blades in such an assembly. The overall diameter of the illustrated embodiment is approximately 24 inches but the cutter head assembly is considered to be an "18 inch" cutter head in accordance with standard designations in this art which make reference to general positions of cutting blades rather than overall diameter as indications of cutter head size.

The illustrated cutter head assembly includes a main body member 60 (shown separately in an elevational view in FIG. 4) and a ring member 62 which is shrunk onto or otherwise secured to the main body member 60 after the blade-receiving slots 100 have been formed into the main body member. Each of the blade-receiving slots 100 is formed radially into the outer circumference of the main body member 60 and at an inclination to the center axis of rotation for the cutter head assembly (angle $D$ in FIG. 4). The front edges 22 of the blade-receiving slots 100 are formed into the front face of the cutter head assembly in positions which are parallel to and very close to radius lines 24 passing through the center of the cutter head assembly. This positioning is selected to permit radial adjustment of individual cutting blades through the use of shims (not illustrated) which may be positioned within the blade-receiving slots 100 prior to positioning a cutting blade in each slot. Alternatively, radial adjustment can be provided through a repositioning of the cutting profile of the cutting blades without using shims.

Three types of cutting blades are illustrated in FIG. 3, and these include an inside cutting blade 64, a bottoming cutting blade 20, and an outside cutting blade 50 (of the type discussed with reference to FIG. 2). Each of these cutting blades is secured into its respective blade-receiving slot with a clamping block 66 and an associated threaded screw element 68. Each of the screw elements 68 is fitted into a threaded bore 70 formed completely through the ring member 62, and each screw element 68 is provided with a recessed outer end of irregular shape for receiving a tool which functions to turn the screw element 68 towards and away from an associated cutting blade. In the preferred embodiment illustrated, each of the clamping blocks 66 is provided with a T-shaped slot extending across its outer face for receiving a shaped head portion 72 of a screw element 68. This arrangement permits a loose securement of each clamping block 66 to its associated screw element 68 so that the clamping blocks 66 will not fall out of their respective slots when they are withdrawn from clamping contact with associated cutting blades. This permits greater ease of assembly and disassembly of the cutter head assembly when blades are installed and removed. In order to assemble the clamping blocks and their associated screw elements into the cutter head assembly, it is necessary to place each screw element and its associated clamping block into a slot of the main cutter body 60 prior to placement of cutting blades in the cutter body. After the ring member 62 is fitted and secured around the cutter body, each screw element and its associated clamping block is inserted into a slot, and the screw element is then turned back into an aligned bore 70. The ring member can be heat shrunk into place or secured to the main body member with additional screw elements (not shown) which function to fasten the ring member to the main body member.

FIG. 4 illustrates an arrangement of blade-receiving slots 10 abd a single outside cutting blade 50 for a cutter head assembly of the type illustrated in FIG. 3. A total of 36 blade-receiving slots 100 were formed into the main body member 60 for receiving sequences of bottoming/outside cutting/bottoming/inside cutting blades around its entire circumference. The outside cutting blade 50 which is illustrated in one of the blade-receiving slots shown in FIG. 4 is positioned with a zero hook angle (since a projection of its cutting edge 34 coincides with the trace 40 in accordance with the discussion FIG. 2 above) and with an angle of inclination D of about 12°. A side rake angle A for such a cutting blade is produced on the front face of the bar stock from which the cutting blade is formed and not by an angular positioning of selected blade-receiving slots for such types of cutting blades. Also, FIG. 4 illustrates the need for forming an extension of bore 70 (see FIG. 3) into a side wall of each blade-receiving slot 100 (although only one such bore extension is illustrated on FIG. 4) to fit the screw elements 68 and their associated clamping blocks 66 into the inclined blade-receiving slots. This is necessary to provide optimum centering of individual screw elements in line with a narrow bearing surface (surface 79 in FIG. 5) of certain types of blades used with this assembly.

FIGS. 5 through 8 illustrate geometric and dimensional relationships for a single outside cutting blade 50 of the type used with the cutter head assembly shown in FIGS. 3 and 4. As shown, each such cutting blade is formed from a length of high speed steel (for example, M2 steel) having a truncated cross-sectional shank shape as shown in FIG. 5. This cross-sectional shape results from removing material from one side of bar stock which is otherwise rectangular in cross-section, and the removal of material produces a front face 52 which becomes a permanent part of the finished cutting blade. The angular disposition of this front face 52 determines a rake angle A for the cutting blade when it is installed in a blade-receiving slot 100 of the main body member 60 of the assembly. As shown in FIG. 5, a narrow flat surface 53 is left untouched to provide a flat bearing surface for fitting the blade against a side wall of a blade-receiving slot. FIG. 5 also illustrates other surfaces which are formed on the cutting end of an outside cutting blade, and these include a topland portion 80 and side surfaces 86 and 88 each having an appropriate relief from the front face 52 to the back face 84.

FIG. 6 is a view of the cutting blade 50 shown in FIG. 5 as it would be seen with a back face 84 (see FIG. 5) of the cutting blade laying in the plane of the drawing.

FIGS. 7 and 8 illustrate side views of the cutting blade 50 as it would be seen from opposite sides. The FIG. 7 view dramatizes the effect of the truncated cross-sectional shape of the blade on the position of the cutting edge 34. The angular position of this edge is maintained without removing any material from the front face portion 52 during subsequent resharpening of the blade. During resharpening, side surfaces 86 and 88, and the topland 80 (with any desired radius required on that surface) are resharpened in accordance with the method of U.S. Pat. No. 3,881,889.

As indicated above, bottoming type cutting blades do not require a truncated cross-sectional shape, however, inside cutting blades are provided with an angular cutting face similar to that shown for the outside cutting blade in FIG. 5 but in an opposite direction (as can be seen from the FIG. 3 view).

Having described basic features of the present invention and a preferred embodiment thereof, it can be appreciated that various shapes and sizes of cutting blades can be used with the cutter head assembly without departing from the intended scope of invention which includes the concept of designing a cutter head body to receive different types and a range of geometries of cutting blades having front face portions which are not removed during resharpening.

What is claimed is:

1. In a cutter head assembly of a type which can carry of plurality of cutting blades projecting from a front face thereof for engaging and cutting a workpiece to form gear tooth slots in the workpiece, said cutting head assembly including (a) a main body member having blade-receiving slots formed radially into the outer circumference thereof and at an inclination to its center axis of rotation, and (b) a ring member for enclosing said circumference of the main body member and for securing said cutting blades therein, an improvement in said cutter head assembly for making it more universal in its acceptance of different types of cutting blades having cutting face portions which do not require resharpening, said improvement comprising a relationship of each blade-receiving slot to a plane of rotation (10) located at a front face of the cutter head, a reference plane (16) which is perpendicular to the plane of rotation (10) and positioned to pass through a center axis of rotation of the cutter head, and another reference plane (18) which is positioned at right angles to both of the planes (10) and (16) such that each blade-receiving slot has a front edge (22) which is positioned on or adjacent to a radius taken from the center axis of said main body member in said plane of rotation (10), so that a single blade carried within each slot can be radially adjusted relative to the center axis of the assembly, and each blade-receiving slot is inclined to said reference plane (16) at an included angle D which is related to a range of pressure angles and possible side rake angles of cutting blades which can be mounted in said slot, so as to avoid a negative hook angle position for any blade carried within a given slot, wherein said angle D is determined by a projection of a cutting edge (34) of such a cutting blade onto said reference plane (16), and said hook angle is determined by a projection of the cutting edge (34) onto the reference plane (18), and including a plurality of cutting blades for use in the cutter head assembly, each of the cutting blades having a cutting face portion which is an extension of a shank portion thereof and which does not require resharpening when the cutting blade is resharpened.

2. The improvement of claim 1 wherein said blade-receiving slots are inclined at an angle of inclination D determined by the relationship:

$$\tan D = \tan C + \tan B \tan A$$

where C is the hook angle and $\geq$ 0, B is the pressure angle, and A is the side rake angle (if any) of a cutting blade to be used in said assembly.

3. The improvement of claim 2 wherein angle D is approximately 12° for cutting blades having pressure angles up to about 32° and side rake angles (for inside and outside cutting blades) of about 20°.

4. The improvement of claim 1 wherein said plurality of blades for a given cutter head assembly include three different types of blades known as (a) bottom cutting blades, (b) inside cutting blades, and (c) outside cutting blades, and wherein each of said inside and outside cutting blades includes a radial rake angle formed into its front cutting face.

5. The improvement of claim 4 wherein said radial rake angles of said inside and outside cutting blades are up to 25° to a radius of said main body member when such blades are installed in the main body of the cutter head assembly.

6. The improvement of claim 1 and including a clamping block and screw element associated with each blade-receiving slot for securing a cutting blade therein, and wherein each clamping block includes a T-shaped slot for receiving a head portion of a screw element so that said clamping block is retained in said blade-receiving slot when cutting blades are inserted or removed into or out of said cutter head assembly.

7. In a cutter head of a type which can carry a plurality of cutting blades projecting from a front face thereof for engaging and cutting a workpiece to form gear tooth slots in the workpiece, said cutting head including a main body member having blade-receiving slots formed radially into the outer circumference thereof and at an inclination to its center axis of rotation, the improvement in said cutter head for making it more universal in its acceptance of different types of cutting blades having cutting face portions which do not require resharpening, comprising each blade-receiving slot being formed so that a front edge (22) thereof is positioned on or closely adjacent to a radius (24) taken from the center axis of said main body member and lying in a front face plane (10) of the main body member, so that a single blade carried within each slot can be radially adjusted relative to the center axis of the cutter head, and each blade-receiving slot being inclined to a reference plane (16) at an included angle D which is related to a range of pressure angles and possible side rake angles of cutting blades which can be mounted in said slot so as to avoid a negative hook angle position for any blade carried within a given slot, said reference plane (16) being perpendicular to the plane of rotation (10) and positioned on said radius (24), and wherein said angle D is determined by the relationship:

$$\tan D = \tan C + \tan B \tan A;$$

where C is a hook angle $\geq$ 0 determined by a projection of a cutting edge (34) onto a reference plane (18) which is positioned at right angles to both of the planes (10) and (16); where B is a pressure angle determined by a projection of said cutting edge (34) onto said reference plane (16); and where A is a side rake angle (if any) as seen in said plane of rotation (10) for a cutting blade installed in the cutter head.

* * * * *

UNITED STATES PATENT OFFICE
CERTIFICATE OF CORRECTION

PATENT NO. : 4,060,881
DATED : December 6, 1977
INVENTOR(S) : Arthur B. Ryan and Charles B. Thomas It is certified that error appears in the above-identified patent and that said Letters Patent are hereby corrected as shown below:

In claim 1, column 8, line 51, the first word "of" should read --a--.

In claim 1, column 9, line 16, the phrase "angle D" should read --pressure angle--.

In claim 5, column 9, line 48, the word "radial" should be --side--.

Signed and Sealed this

Thirteenth Day of March 1979

[SEAL]

Attest:

RUTH C. MASON
Attesting Officer

DONALD W. BANNER
Commissioner of Patents and Trademarks